June 17, 1969

R. A. EDWARDS 3,450,146

DRAIN VALVE

Filed July 10, 1967

INVENTOR.
RICHARD A. EDWARDS
BY

United States Patent Office 3,450,146
Patented June 17, 1969

3,450,146
DRAIN VALVE
Richard A. Edwards, Denver, Colo., assignor to Wilkerson Corporation, Englewood, Colo., a corporation of Colorado
Filed July 10, 1967, Ser. No. 652,310
Int. Cl. F16t; F16k *31/00;* B05b *1/30*
U.S. Cl. 137—203                  9 Claims

ABSTRACT OF THE DISCLOSURE

This invention relates to a drain valve for internally-pressurized vessels having a drain opening in the bottom thereof. The valve includes an externally-flanged elastic tube mounted in fluid-tight sealed relation within the drain opening. The flanged end of the tube has an upstanding continuous-annular knife-edge seat adapted to form a high-pressure seal with a flat head formed on the upper end of a rigid valve member. Projecting from the underside of the head is a stem that extends down into the tube and terminates in an annular flange that has a greater diameter than the inside of the tube so as to stretch the latter and form a second low-pressure seal therewith.

---

Figure 1:
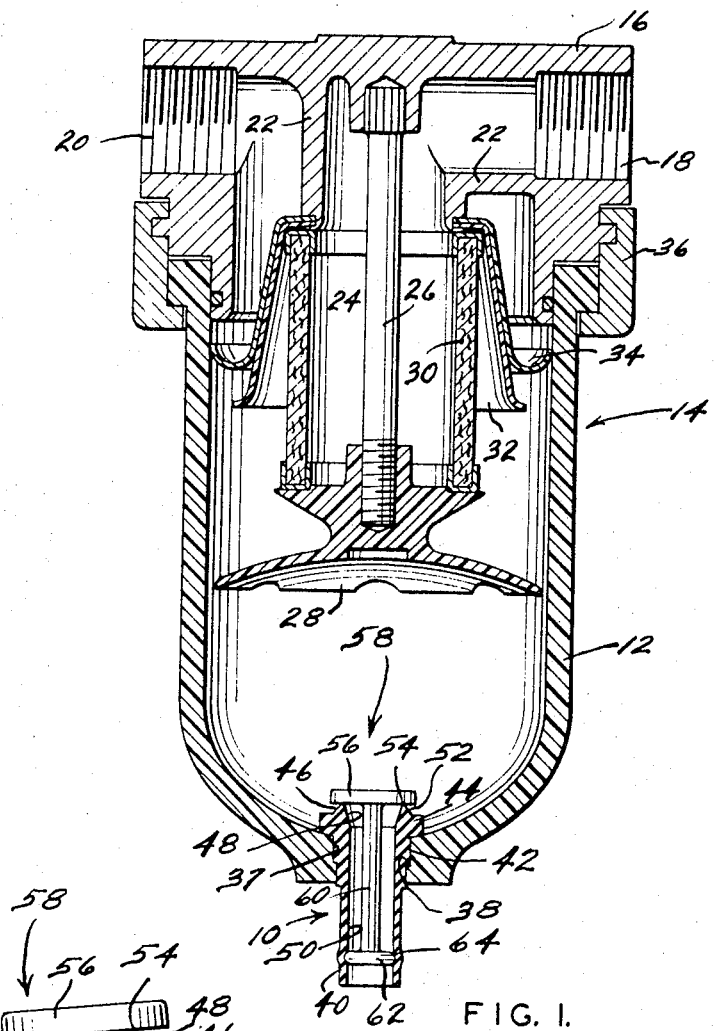

The broad concept of utilizing the internal fluid pressure in a vessel to hold the flat head of a rigid valve member in fluid-tight sealed engagement with a continuous-annular deformable valve seat is notoriously old in the art as is the added feature of providing the valve element with an elongate stem accessible to the operator which, upon being moved to one side, will function to tilt the head so a portion thereof lifts off the seat and lets the contents escape.

Presently, millions of valves of the general type above-mentioned are used on aerosol cans as the means for sealing the contents therein as well as dispensing same therefrom. In this application, however, the problems are somewhat different than those involved in an intermittently pressurized vessel. For example, in the case of an aerosol product, the internal pressure acting to keep the valve seated is present up until the time the contents are exhausted, at which point, it becomes immaterial whether it leaks or not because the user has probably thrown it away. Thus, the conventional aerosol can valve is entirely adequate for its intended use. There remain, on the other hand, many applications in which the applied internal pressure is intermittent in nature and, in these instances, a valve of the type that relies primarily on internal pressure to keep it seated is unsatisfactory.

One such application is that of the filters and traps used in high pressure air and gas lines to remove suspended solid particles and entrained fluids. These units customarily include a head having an inlet port through which the air is introduced under pressure to circulate over baffles and filters housed within a bowl to remove the fluid and solid impurities before exiting through an outlet port. Ordinarily the bowl has to be removed from the head to gain access to the filter in order to clean same; however, in the case of entrained fluids removed from the stream, these can usually be drawn off through a discharge opening provided for this purpose in the bottom of the bowl. Up to the present time, the type of valve structure that has been employed to seal the discharge opening has been a simple screw-in petcock like those found on most automobile radiators. The tiltable aerosol can valve is not satisfactory because a substantial reduction or cessation in applied internal pressure allows the valve to unseat and the fluid to leak from the bowl. Similarly, the screw-type petcock, while satisfactory from the standpoint of holding the trapped liquid in the bowl when the applied internal pressure drops or the air supply is turned off altogether, has disadvantages of its own in terms of slowness of operation, corrosion resistance, clogging and sticking.

It has now been found in accordance with the teaching of the instant invention that these and other objections to the petcock and tiltable-stem-type drain valves of the prior art can be overcome by adding to the tiltable-stem valve a second head adapted to cooperate with the elastic tube by slightly distending same so as to form an additional continuous annular low-pressure seal therewith. Under conditions of relatively high internal pressure, the first of the two heads is biased into fluid-tight sealed relation with the upstanding annular seat formed atop the deformable tubular member in the customary manner; however, when the pressure inside the vessel drops to near ambient conditions thus allowing the valve element to unseat and break the high-pressure seal, any fluid passing into the tube will be retained by the low-pressure seal. Then, at such time as the user wishes to drain fluid from the vessel, he merely tilts the valve element when the latter is under the condition of relatively high internal pressure. The fluid moving past the high-pressure seal has enough pressure to further expand the elastic tubular member so that it can exit past the low-pressure seal.

It is, therefore, the principal object of the present invention to provide a novel and improved drain valve specifically designed for use on intermittently pressurized vessels.

A second objective is the provision of a valve of the type aforementioned that is extremely simple and inexpensive in that it includes only two easily fabricated parts.

Another object is to provide a drain valve that has no moving parts in the usual sense in which this term is used thus resulting in a unit that is extremely reliable and free from the common problems of sticking, excessive wear, breakage and other conditions that usually cause a valve to malfunction.

Still another objective of the invention herein disclosed and claimed is to provide a drain valve for pressurized vessels that is faster and easier to use than the prior art valves for this purpose; yet, maintains an efficient liquid-tight seal.

An additional object is to provide an improved tiltable-stem valve that can be manufactured of various corrosion-resistant materials depending upon its particular application and still function in the same manner.

Further objects are to provide a drain valve that is compact, lightweight, efficient, versatile, rugged and even decorative.

Figure 2:
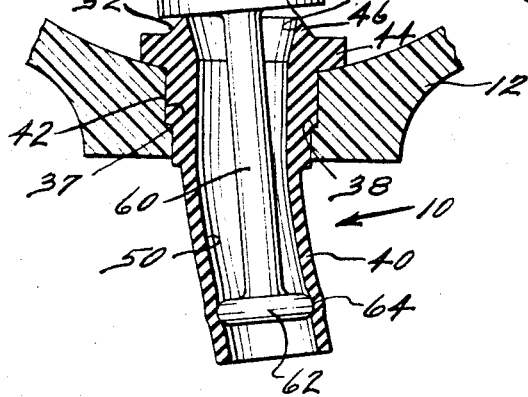

Other objects will be in part apparent and in part pointed out specifically hereinafter in connection with the description of the drawings that follows, and in which:

FIGURE 1 is a diametrical section showing a conventional high-pressure air line filter equipped with the drain valve of the present invention; and, FIGURE 2 is an enlarged fragmentary sectional detail showing the valve in actuated position.

Referring now to the drawings for a detailed description of the present invention and, initially, to FIGURE 1 for this purpose, reference numeral 10 has been employed to designate the drain valve broadly and the latter will be seen located in the bottom of a bowl 12 of an internally-pressurized vessel that has similarly been referred to in a general way by reference numeral 14. In the particular form illustrated, vessel 14 comprises a filter of the type customarily employed on compressed air lines for removing both solid and liquid impurities contained within the gas stream. Specifically, it includes a head 16 having an inlet opening 18 facing upstream, an outlet 20 facing downstream and a partition wall 22 therebetween arranged to deflect incoming gas into filter chamber 24. Extending down into the filter chamber 24 is a rod 26 whose upper extremity is fastened permanently to the head while the lower end is threaded to accept concave disk deflector plate 28 that holds filter element 30 up against the annular groove provided to receive same in the underside of partition wall 22. A pair of generally bell-shaped baffles 32 and 34 surround the filter element and cooperate therewith and with deflector 28 to remove any solid and liquid impurities contained in the gas stream before discharging it through outlet 20. A lock ring 36 couples the flanged bowl 12 to the head 16 in the well-known manner to provide a fluid and air-tight connection therebetween. The solid particles will, ordinarily, be trapped inside the filter chamber while the fluid impurities will pass therethrough and impinge upon either the baffles 32 and 34 or deflector 28 where they will eventually collect in the bottom of the bowl.

Now, pressure vessel 14 as has just been briefly described is not, in itself, novel, nor does it constitute a part of the instant invention; but, instead, it is intended as being merely illustrative of one type of internally pressurized vessel for which the drain valve 10 is ideally suited. It is significant to mention, therefore, that the drain valve can be used to advantage in many other types and styles of pressurized vessels that need fluid drawn off therefrom periodically. It will function satisfactorily, for example, in most of the same applications that now employ the prior art tilting-stem valves and petcocks although, admittedly, its low-pressure secondary seal is of little, if any, value in vessels under constant positive pressure as the primary seal will usually suffice. Accordingly, the real merit of the unit is realized when the valve is applied to intermittently pressurized vessels which, under ambient pressure conditions, will allow the fluid to leak past the primary seal. It is such a vessel that has been illustrated herein and in connection with which the details of the valve will now be set forth specifically by referring to both FIGURES 1 and 2 of the drawings.

The bottom of bowl 12 contains a drain opening 37 which, in the specific form shown, is cylindrical and includes two sections of slightly different diameter separated by a step 38. Sealed within drain opening 37 is an elastic tube 40 whose bowl-engaging outside surface 42 is shaped to conform with the step-cut surface just described. The portion of tube 40 projecting up into the bowl has an integrally-formed continuous annular flange 44 projecting therefrom that engages the bottom of the bowl and cooperates with step 38 to prevent said tube from dropping out through the bottom of the drain opening.

Atop this annular retaining flange is formed an integral upstanding continuous annular deformable seat 46 which borders the flared frusto-conical entryway 48 that leads into the cylindrical hollow interior 50 of the tube. The outer surface 52 of the seat tapers upwardly and inwardly to intersect the flared entryway and produce an essentially knife-edged easily deformed surface 54 capable of making line contact with the underside of the upper head 56 of the valve element that has been broadly designated by reference numeral 58.

Valve element 58 is essentially spool-shaped consisting of a stem portion 60 with flat circular disk-like heads 56 and 62 disposed on opposite extremities thereof. The entire valve element is rigid and of one-piece construction. The upper head 56 has a planar undersurface adapted to press down upon the seat 46 and deform same under the influence of positive internal pressure impressed thereon from inside the vessel so as to form the primary or high-pressure seal. The head 56, of course, has a diameter slightly greater than that of its seat 46.

Stem 60 has a diameter substantially less than the inside diameter 50 of tube 40 so that it can be tilted from side-to-side as shown in FIGURE 2 to lift head 56 off seat 46 and permit the fluid to escape into said tube. Actually, when the internal pressure inside bowl 12 drops to at or near ambient pressure, leakage can, and usually does, occur past the primary seal.

Now, the lower head 62 of the valve element is spaced a substantial distance below upper head 56 so as to engage the tube 40 at a point well beneath the portion thereof restrained by bowl 12. The diameter of the lower head is greater than the internal diameter of tube 40 by an amount capable of keeping the latter slightly distended or stretched at all times so as to form therewith the secondary or low-pressure fluid-tight seal. The peripheral margin 64 of head 62 is preferably rounded as shown to form a broader area of contact with the tube.

The secondary or low-pressure seal made between head 62 and tube 40 is such that it will hold inside said tube any fluids leaking past the primary seal under ambient pressure conditions or those of minimal differential pressure impressed on opposite sides thereof; however, under conditions of relatively high positive pressure inside bowl 12 such as exist when the compressed air is passing therethrough, tilting the valve element off seat 46 will admit a fluid pressure to the secondary seal sufficient to further distend elastic tube 40 and permit the fluid to flow past head 62. Thus, the valve includes a high-pressure seal that remains closed under normal high-pressure operating conditions and a low-pressure seal adapted to hold any fluid leaking past the high-pressure seal under low-pressure conditions but incapable of retaining same under the influence of high fluid pressures compressed thereon when the valve element is unseated by actuating same.

Having thus described the several useful and novel features of the drain valve of the present invention, it will be seen that many worthwhile objectives for which it was designed have been achieved. Although but a single specific embodiment has been illustrated and described in connection with the accompanying drawings, I realize that certain changes and modifications therein may well occur to those skilled in the art within the broad teaching hereof; hence, it is my intention that the protection afforded hereby shall be limited only insofar as said limitations are specifically set forth in the appended claims.

What is claimed is:

1. A drain valve for removing fluids from intermittently-pressurized vessels having a drain opening in the bottom thereof which comprises: an elongate elastic tube having an upstanding continuous annular deformable seat formed on the upper end thereof fastened in fluid-tight relation inside the drain opening; and, a rigid valve member having upper and lower heads interconnected by an elongate stem disposed centrally within the tube, said upper head having an essentially planar underside sized and positioned to press down against the annular seat and form a continuous annular fluid-tight annular seal therewith under the influence of a positive fluid pressure impressed inside said vessel, and said second head having a diameter slightly greater than the inside diameter of said tube so as to distend same and form a fluid-tight continuous annular low-pressure seal therewith adapted to confine any fluid leaking past the high-pressure seal under conditions of reduced internal fluid pressure, said tube and lower head also cooperating to pass fluid when the stem is moved to one side so as to tilt the upper head off the seat and admit fluid pressure to the low-pressure seal of a magnitude capable of keeping said high-pressure seal intact when said stem is centered.

2. The drain valve as set forth in claim 1 in which: an integrally-formed annular flange encircles the seat and functions to prevent withdrawal of the tube out through the bottom of the drain opening.

3. The drain valve as set forth in claim 1 in which: the seat includes a pair of oppositely-inclined frusto-conical surfaces that intersect one another to produce a sealing surface that makes essentially line contact with the underside of the upper head.

4. The drain valve as set forth in claim 1 in which: the tube projects a substantial distance beneath the bottom of the drain opening, the length of the stem is less than that of the tube, and the lower head engages the tube intermediate its ends and along a portion thereof that is unrestricted by the wall of the pressure vessel bordering said drain opening.

5. The drain valve as set forth in claim 1 in which: the upper head is essentially disk-shaped having a diameter greater than the seat it rests atop to form the high-pressure seal.

6. The drain valve as set forth in claim 1 in which: the lower head is essentially circular and includes a convex rounded edge adapted to make area contact with the adjoining tube surface.

7. The drain valve as set forth in claim 1 in which: the cross setional area of the stem is substantially less than the cross sectional area of the inside of the tube so as to provide an annular fluid-flow passage therebetween.

8. The drain valve as set forth in claim 1 in which: the tube is made of rubber.

9. The drain valve as set forth in claim 1 in which: the wall-thickness of the tube is selected such that it can be deflected from side-to-side in order to move the stem into a position whereby the upper head will tilt off the seat.

References Cited

UNITED STATES PATENTS

| 1,864,978 | 6/1932 | Cottrell | 251—342 |
| 2,785,016 | 3/1957 | Vollertzen | 239—576 X |
| 2,892,574 | 6/1959 | Noe | 222—402.23 |

ALAN COHAN, *Primary Examiner.*

U.S. Cl. X.R.

222—402.23; 239—576, 577; 137—614.11; 251—342